United States Patent [19]
DeSantis

[11] Patent Number: 4,550,551
[45] Date of Patent: Nov. 5, 1985

[54] SAGGER LOADER AND CONVEYOR APPARATUS AND METHOD

[76] Inventor: Raymond P. DeSantis, 2710 Timberwyck Trail, Troy, Mich. 48098

[21] Appl. No.: 465,166

[22] Filed: Feb. 9, 1983

[51] Int. Cl.⁴ .......................... B65B 5/08; B65B 5/10; B65G 47/52
[52] U.S. Cl. ......................................... 53/534; 53/246; 53/251; 198/468.6; 414/733; 414/752; 901/37
[58] Field of Search ................ 53/444, 472, 475, 148, 53/534, 539, 236, 246, 247, 251; 901/37, 40, 15; 414/752, 733, 737, 732; 198/409, 428, 430, 486

[56] References Cited

U.S. PATENT DOCUMENTS

| | | | |
|---|---|---|---|
| 2,976,659 | 3/1961 | Flanagan et al. | 53/251 X |
| 3,575,302 | 4/1971 | Cafolla | 414/732 |
| 3,735,556 | 5/1973 | Dille et al. | 53/251 X |
| 4,365,705 | 12/1982 | Zinck et al. | 53/534 X |
| 4,444,540 | 4/1984 | Blatt et al. | 414/732 X |

FOREIGN PATENT DOCUMENTS 0257331 4/1970 U.S.S.R. .............................. 53/247

Primary Examiner—Francis S. Husar
Assistant Examiner—Steven B. Katz

[57] ABSTRACT

An apparatus and method for transferring parts travelling in a single row on a first conveyor to a receptacle travelling on a second conveyor, the parts being placed in the receptacle in consecutive rows of a plurality of the parts. A part loader, comprising an elbow-joint arm having a pivotable first arm and a second arm mounted on the end of the first arm pivotable relative to the first arm, supports a part pick-up member mounted on the end of the second arm which picks up at least one part from the end of the first conveyor and transfers the part to the receptacle on the second conveyor. Alternatively, the part pick-up member is adapted to pick up a row of parts from the first conveyor and to place one row of parts in the part receptacle, or to rotate a part during transfer from the first conveyor to the part receptacle.

13 Claims, 22 Drawing Figures

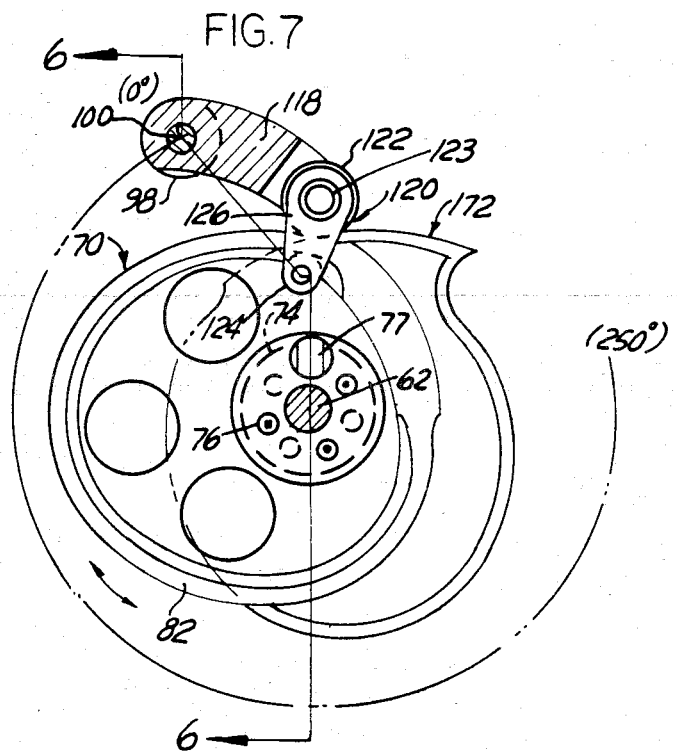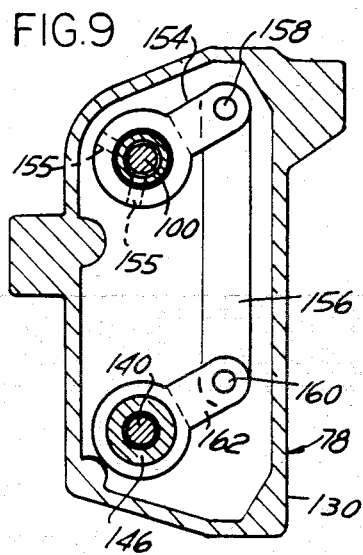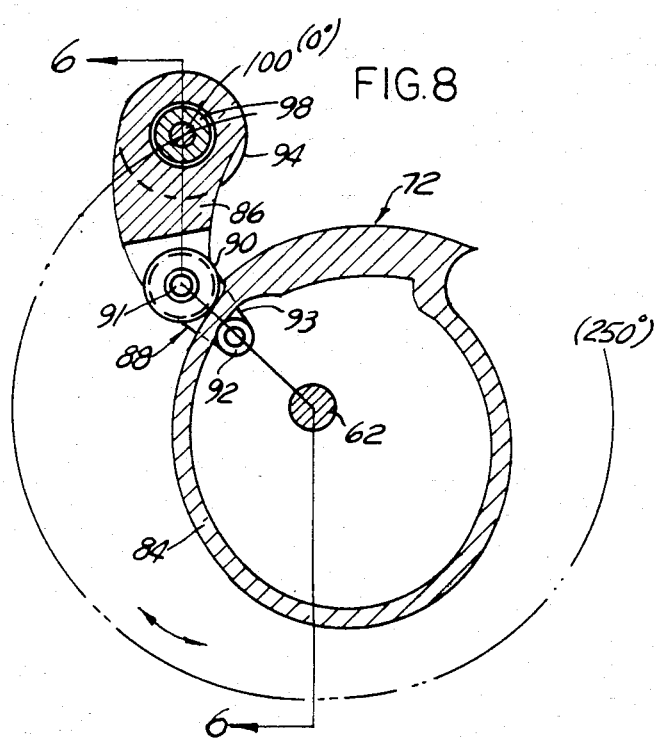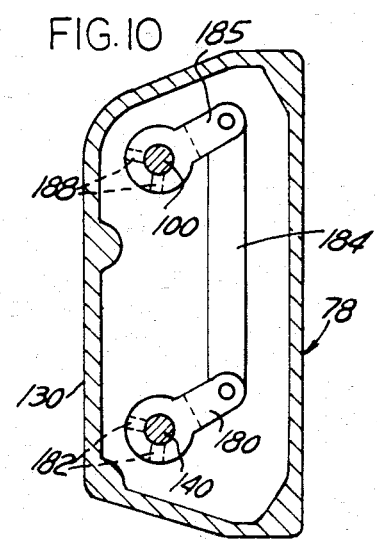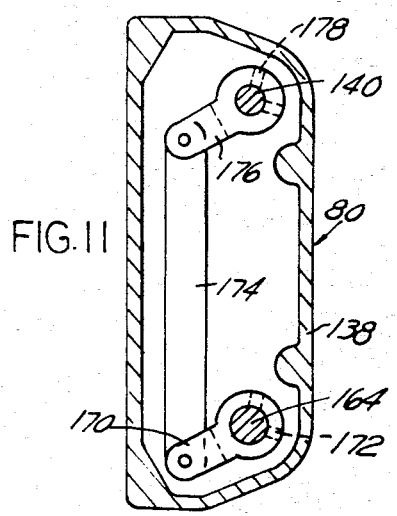

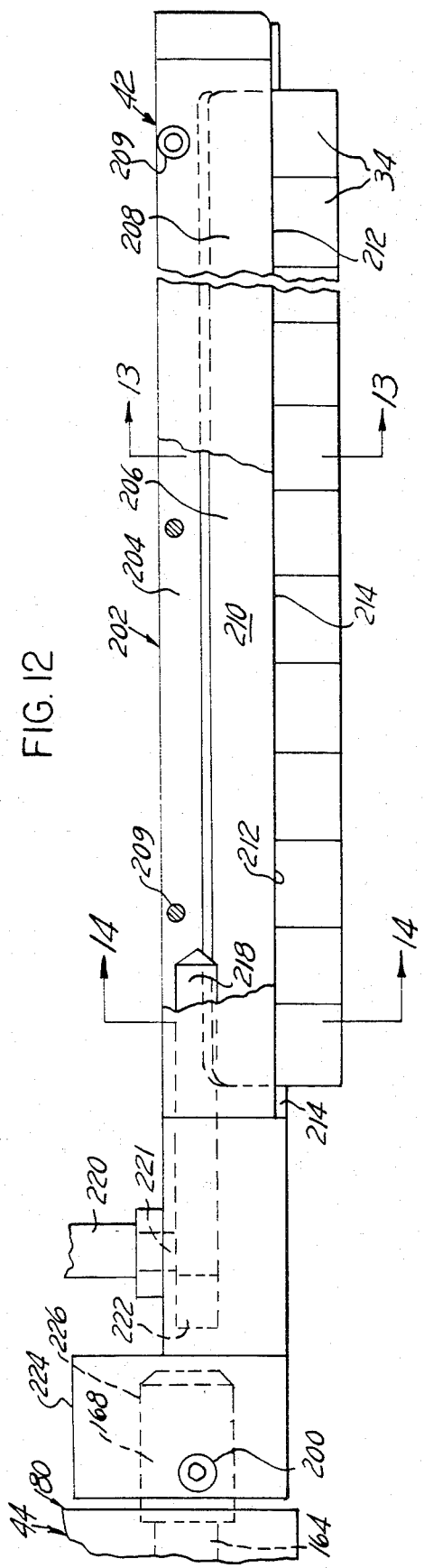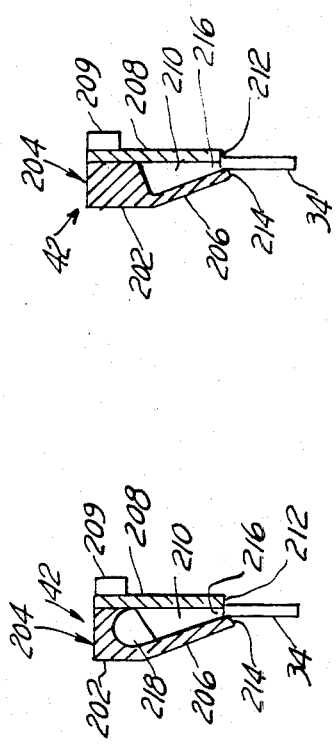
FIG. 12
FIG. 13
FIG. 14

SAGGER LOADER AND CONVEYOR APPARATUS AND METHOD

The present invention relates to a sagger loader and conveyor apparatus in general and more particularly to an apparatus and method for automatically conveying powder compacted articles or parts from a powder compacting press to saggers in which the parts are automatically loaded in a specific order, by rows for example, the saggers being on a moving conveyor belt.

BACKGROUND OF THE INVENTION

Most articles and parts compacted of powder material in a powder compacting press are ultimately loaded in ceramic boats or saggers, after ejection from the press. The saggers are used for conveying the parts through a "firing" or sintering furnace. The parts, as ejected from the press, are in a so-called "green" state wherein the particles of powder material are held in adhesion by a binder, and they are therefore relatively fragile.

Safe mechanical handling of such fragile parts presents many problems when the parts are transferred to a loading station, for example, where they are loaded in even rows in saggers and subsequently transported in the saggers to a sintering furnace. In view of the difficulties encountered in handling such fragile parts, manual sorting of the parts and manual loading of the saggers are often the solutions dictated by the necessity of avoiding damaging the parts when in their green and fragile state. The problem of appropriately loading saggers with fragile parts is further complicated by the fact that the parts must be placed in a regular order in the saggers, rather than in bulk at random, sometimes spaced apart in a row and the successive rows being also spaced apart, such as to allow the sintering operation to be effected under good conditions, with adequate air or inert gas circulation around the parts, without fusing the parts in a mass, and with even heating and cooling of the parts during travel through the sintering furnace and during any subsequent heat treatment operation, such as quenching for example.

SUMMARY OF THE INVENTION

The present invention provides a part conveyor and container loader particularly well adapted to handling fragile parts such as green powder compacted parts being loaded in saggers. The present invention provides transfer of the parts from the ejection station of a powder compacting press to a sagger loading station where the parts are automatically transferred one at a time, or a row at a time, from a conveyor to one of a plurality of saggers transported by a second conveyor.

The many objects and advantages of the present invention will become apparent to those skilled in the art when the following description of the best mode contemplated for practicing the invention is read in conjunction with the accompanying drawing wherein like reference numerals refer to like elements and in which:

BRIEF DESCRIPTION OF THE DRAWING

FIG. 7 is a partial sectional view along line 7—7 of FIG. 6;

FIG. 8 is a partial sectional view along line 8—8 of FIG. 6;

FIG. 9 is a partial view from line 9—9 of FIG. 6;

FIG. 10 is a section along line 10—10 of FIG. 6;

FIG. 11 is a section along line 11—11 of FIG. 6;

FIG. 12 is a partial view from line 12—12 of FIG. 3;

FIG.13 is a section along line 13—13 of FIG. 12;

FIG. 14 is a section along line 14—14 of FIG. 12;

DETAILED DESCRIPTION OF THE PREFERRED EMBODIMENTS

Figure 1:
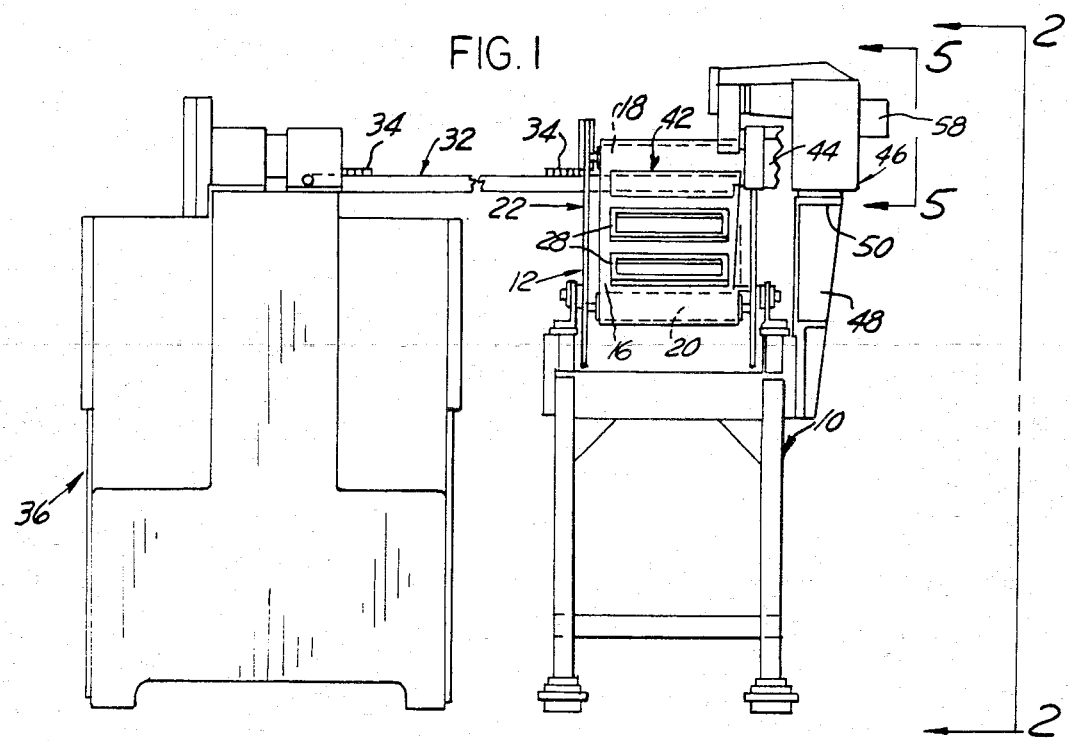
FIG. 1 is a front elevation view of a part and sagger loader and conveyor apparatus according to the present invention.
Figure 2:
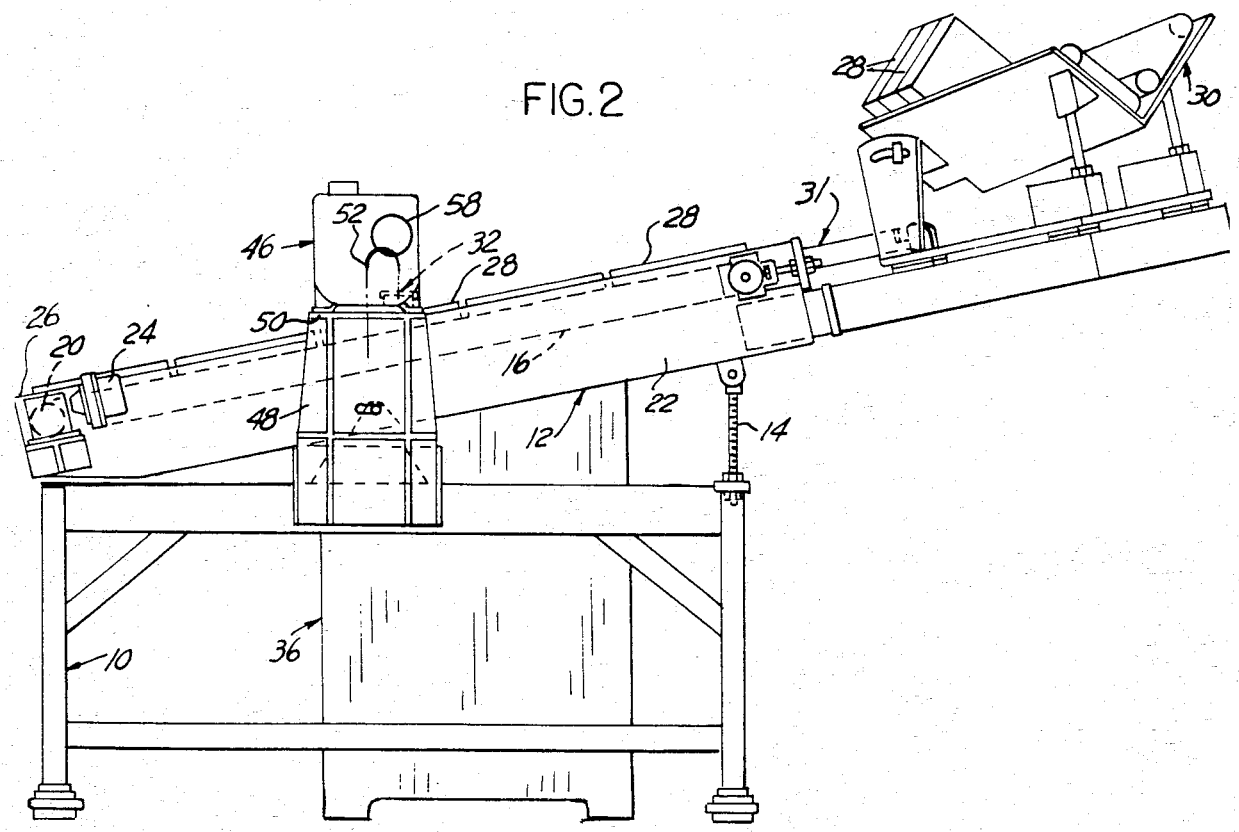
FIG. 2 is a side elevation view thereof from line 2—2 of FIG. 1.
Figure 3:
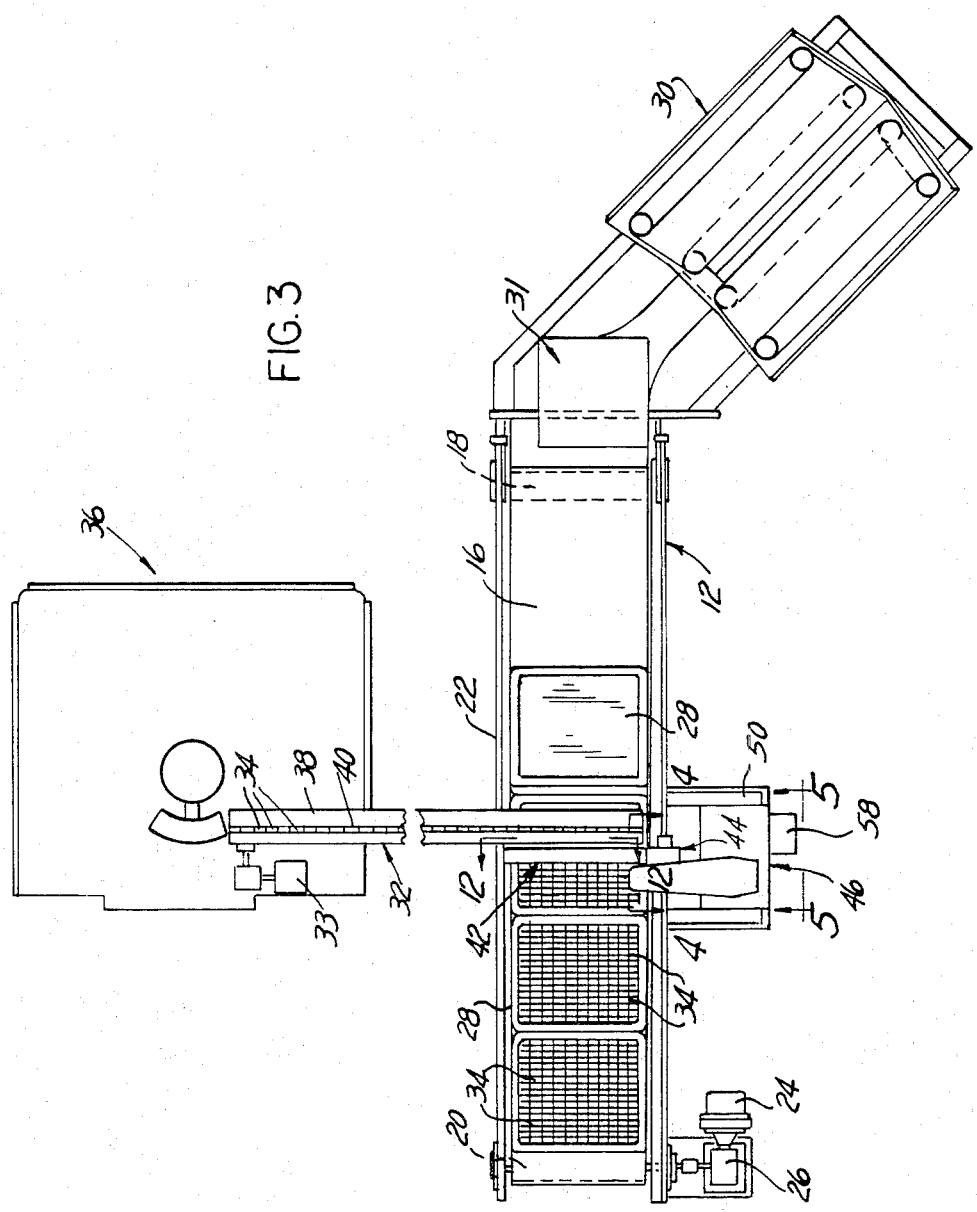
FIG. 3 is a top plan view thereof.

Referring to FIGS. 1-3, a powder compacted part conveyor and sagger loading apparatus according to the present invention comprises a frame structure 10 supporting from the ground a sagger conveyor 12. The sagger conveyor 12 is disposed at an angle, and adjustable support pillers 14 are provided for adjustment of the angle of inclination of the sagger conveyor 12. The sagger conveyor 12 comprises an endless belt 16 supported by a free-wheeling drum 18 at one end and a power driven drum 20 at the other end, the drums 18 and 20 being in turn rotatably supported by a frame 22, as is well known in the art. A stepping electrical motor 24, through a gear reduction drive 26, drives the power driven conveyor drum 20. Appropriate support rollers, not shown, may be disposed between the sides of the frame 22 at diverse locations along the conveyor belt 16 to provide additional support to the belt and to the load carried by the belt.

A plurality of ceramic boats or saggers 28 are stored in a sagger magazine 30, from which they are transferred one at a time manually or by way of an appropriate automatic loading mechanism 31, forming no part of the present invention.

A part conveyor 32, driven by a geared-down stepping motor 33, is disposed substantially horizontally with its longitudinal axis at a right angle to the longitudinal axis of translation of the sagger conveyor 12. The part conveyor 32 carries "green" powder compacted parts 32 from the part ejection station of a powder compacting press 36. The powder compacting press 36 may be of the type disclosed in U.S. Pat. Nos. 4,166,716, 4,153,399, 3,826,599, 3,741,697, 3,730,659, 3,715,796, 3,574,892, 3,561,056, 3,561,054, and 3,415,142, for example, all assigned to the same assignee as the present application.

The parts 34, for example in the form of green carbide cutting inserts, after ejection from the ejection station of the powder compacting press 36 are disposed in a single row on the belt, not shown, of the conveyor 32. The belt of the part conveyor 32 is covered with a cover or shield 38, FIG. 3, having a slot 40 whose edges act as lateral guides for the row of parts 34. Upon reaching the end of the part conveyor 32 overhanging over the sagger conveyor 12, the parts 34 are taken one at a time, or one row at a time, each row consisting of a predetermined number of parts, by a pick-up unit or wand 42 mounted on the end of the pivotable elbow-joint arm 44 of a sagger loader 46. The sagger loader 46 is mounted on a support plate 50 attached to the top of a bracket 48 affixed to the side of the conveyor support frame 10. The part pick-up unit or wand 42, mounted on the end of the loader elbow-joint arm 44, engages a row of parts 34 at the end of the part conveyor 32, or a single part at a time, and is subsequently lifted by the elbow-joint arm 44 from above the part conveyor 32, displaced laterally along a curve, for example to the left as shown at FIG. 2, and moved vertically such as to place the part, or alternatively the row of parts at an appropriate position in a sagger 28 travelling on the sagger conveyor 12, along the path arbitrarily represented at FIG. 2 by a phantom line 52. During placement of the part or row of parts 34, the motion of the sagger conveyor belt 16 is stopped as a result of the stepping drive motor 24 having appropriately been momentarily turned off.

Figure 4:
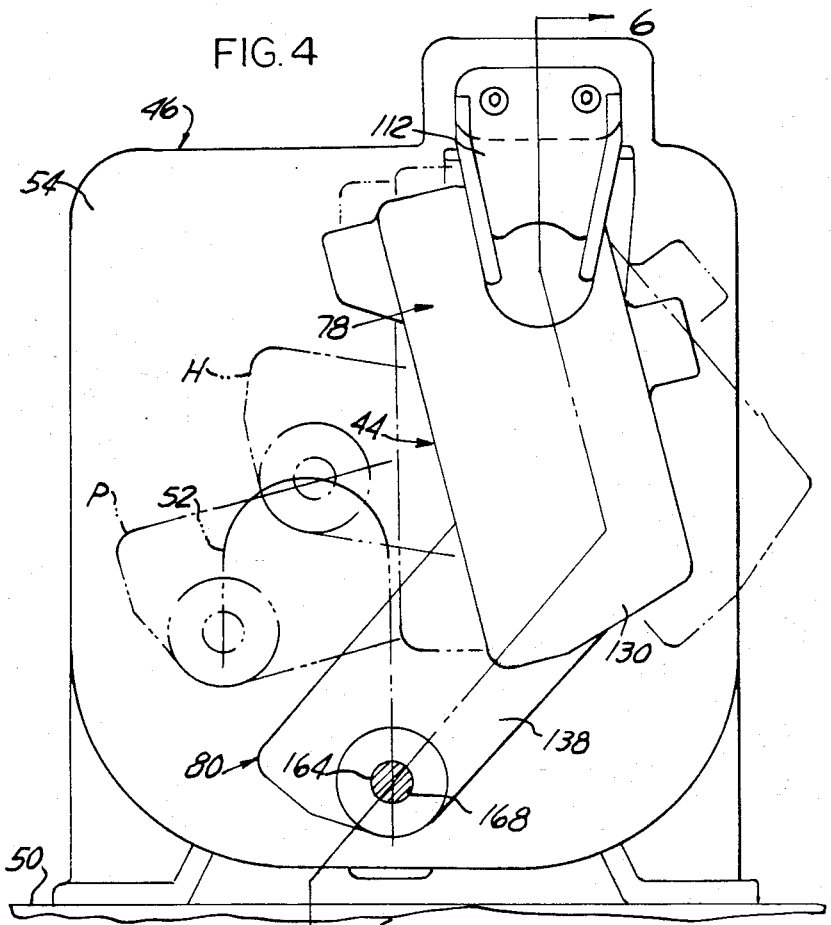
FIG. 4 is a partial elevation view thereof from line 4—4 of FIG. 3.
Figure 5:
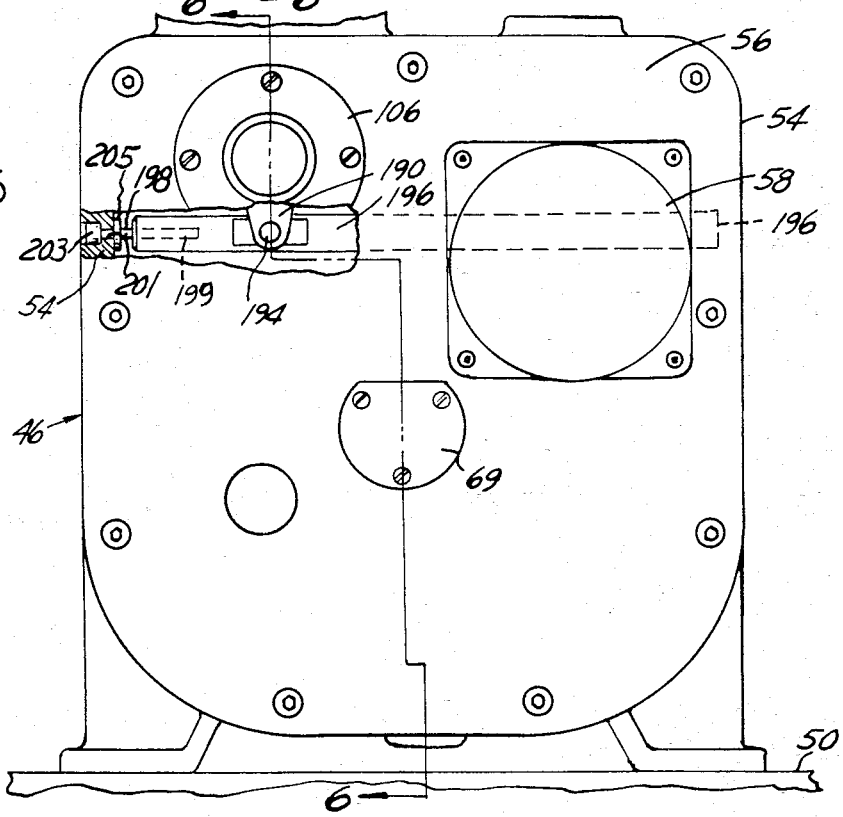
FIG. 5 is a partial elevation view thereof from line 5—5 of FIG. 3.
Figure 6:
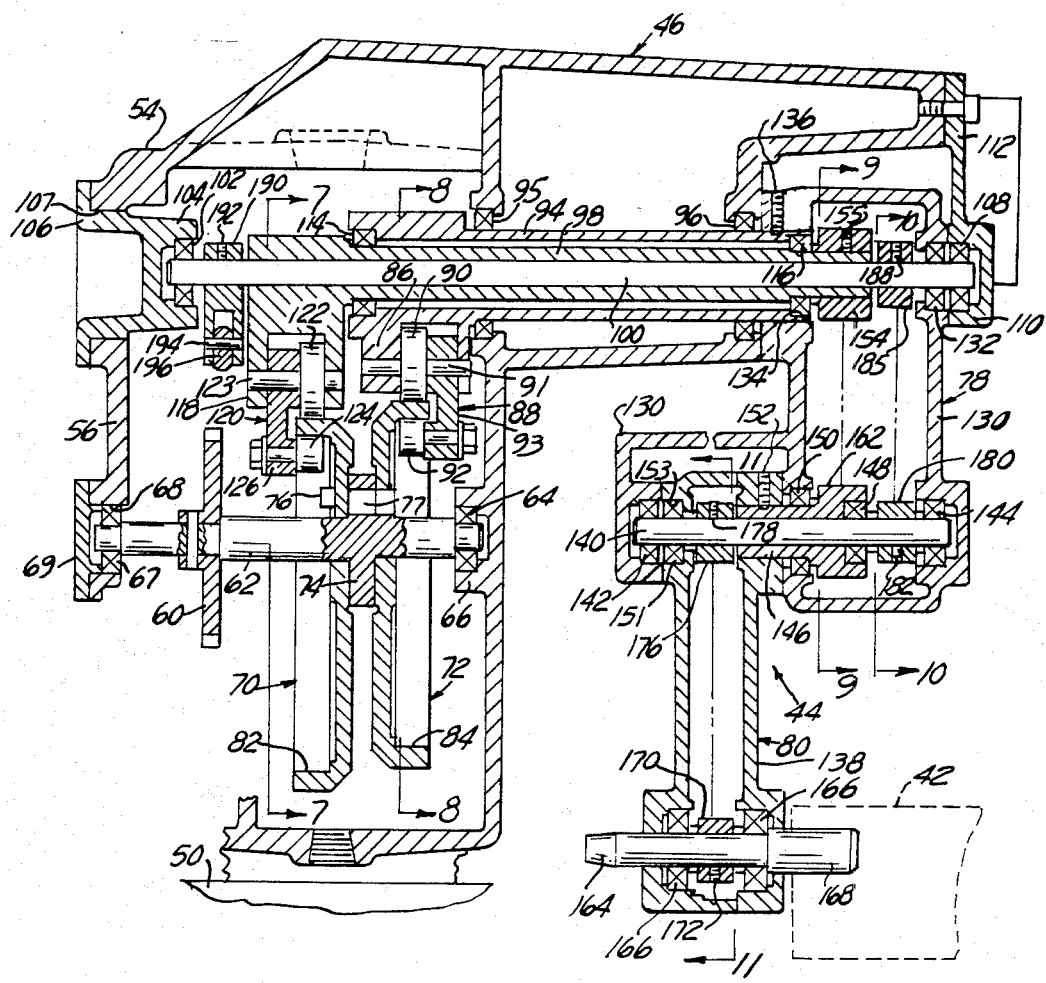
FIG. 6 is a sectional partly schematic view substantially along line 6—6 of FIG. 4 and line 6—6 of FIG. 5.

The loader 46, FIGS. 4-6, bolted on the support plate 50 on the top of the side bracket 48 has a housing 54 provided with a bolted down rear plate 56 on which is mounted an electric stepping motor 58, FIG. 5. The motor 58 drives through an appropriate gear reduction train, not shown, a final reduction toothed wheel 60, FIG. 6, keyed on a camshaft 62 journalled at one end through an appropriate bearing 64 in a boss 66 formed in the opposite wall of the housing 54, and journalled at its other end by means of appropriate bearings 67 held in an aperture 68, in the plate 50, covered by a cover plate 69. A pair of cams 70 and 72 are mounted on the camshaft 62 for rotation thereby, the camshaft 62 being provided with a mounting shoulder 74, and the cams 70 and 72 being attached to the camshaft mounting shoulder 74 by means of bolts 76 and a pin 77, for example. The cam 72 operates the upper arm 78, FIGS. 4 and 6, of the elbow-joint arm 44, while the cam 70 operates the lower arm 80 of the elbow-joint arm 44.

Each cam 70, 72, FIGS. 6-8, has an edge flange or drum portion, 82 and 84 respectively, of constant wall thickness over an arc of, for example, at least 250° around the periphery of the cam. Each cam drum portion 82 or 84 defines an appropriate lobe contour during rotation of respectively the cam 70 or 72. During rotation of the cam 72, a bifurcated arm 86 is pivoted as a result of the engagement of a cam follower 88 mounted on the end of the bifurcated arm 86 with the lobe contour defined by the drum portion 84. The cam follower 88 consists of a relatively large diameter roller 90, mounted in the end of the bifurcated arm 86 by way of a pin 91, in rolling engagement with the peripheral surface of the cam drum portion 84, and of a roller 92, of relatively smaller diameters engaged with the inner surface of the cam drum portion 84, the roller 92 being mounted on the end of a link 92 pivotally attached at its other end to the end of the bifurcated arm 86 by means of the pin 91. Such an arrangement permits the cam followr 88 to precisely follow the contour of the cam drum lobe portion 84, without requiring any return spring for the bifurcated arm 86, and to cause the bifurcated arm 86 to pivot according to the cam lobe contour around an axis of rotation defined by the longitudinal axis of a tubular shaft 94, FIGS. 6 and 8, rotatably supported in the loader housing 54 by means of appropriate bearings such as bearings 95 and 96, the arm 86 being formed integral with an appropriate end of the tubular shaft 94 or attached thereto.

A second tubular shaft 98 is disposed within the tubular shaft 94, the tubular shafts 98 and 94 being disposed in turn concentrically around a solid shaft 100 extending from the housing cover plate 56 to the other end of the housing 54. Appropriate bearings 102 support the solid shaft 100 within a boss 104 formed in a closure cap 106 mounted in an appropriate aperture 107 in the cover plate 56. The other end of the solid shaft 100 is supported by means of appropriate bearings 108 disposed in a boss 110 of a forward cover plate 112.

The inner tubular shaft 98 is supported by appropriate bearings 114 and 116 relative to the outer tubular shaft 94 and is provided at one end with a bifurcated actuating arm 118 formed integrally therewith or attached thereto. A cam follower 120 is mounted on the end of the arm 118, the cam follower 120 consisting of relatively large roller 122, in rolling engagement with the peripheral surface of the lobe drum portion 82 of the cam 70, held by a pin 123 on the end of the bifurcated arm 118, and a relatively small diameter roller 124 in rolling engagement with the inner surface of the lobe cam drum 82. The roller 124 is mounted on the end of a link 126 pivotally attached at its other end to the pin 123. Rotation of the cam 70 therefore causes the arm 118 to oscillate in order for the cam follower 120 to follow the contour of the cam drum portion 82, thus in turn causing the inner tubular shaft 98 to oscillate.

Oscillation of the peripheral tubular shaft 94, as controlled by the cam 72, through the intermediary of the cam follower 88 and the bifurcated arm 86, is transmitted to the upper arm 78 of the loader elbow-joint arm 44. The upper arm 78, FIG. 6, takes the form of an elongated, downwardly extending housing 130 which is pivotable relative to the solid shaft 100 by being supported therefrom at its forward portion by bearings such as bearings 132. The upper arm housing 130 has a rear portion provided with a bore 134 fitting over the outer tubular shaft 94, and is fastened to the outer tubular shaft 94 by means of a radial setscrew 136 such that rotating motion of the outer tubular shaft 94 causes pivoting of the upper arm housing 130.

The lower arm 80 of the elbow-joint arm 44 has a housing 138 which is mounted pivotable around a pivot shaft 140 supported at both ends by bearings 142 and 144 from the bottom of the upper arm housing 130. A tubular shaft 146 is disposed concentrically around the pivot shaft 140. The tubular shaft 146 is supported at one end from the pivot shaft 140 by a bearing 148 and is supported at its other end by a bearing 150 relative to the upper arm housing 130. The lower arm housing 138 is attached to the tubular shaft 146 by one or more setscrews 152 such that rotation of the hollow shaft 146 causes pivoting of the lower arm housing 138 relative to the upper arm housing 130. A bearing 151 is disposed between the periphery of the pivot shaft 140 and a bore 153 in the lower arm housing 138 for supporting the rearward portion of the lower arm housing 138 where the pivot shaft 140 projects therethrough for support by the upper arm housing 130 through the bearing 142.

An arm 154 is fastened to the end of the inner tubular shaft 98 by means such as one or more setscrews 155. Oscillatory rotation of the inner tubular shaft 98, as actuated by its other arm 118 according to the contour of the cam lobe drum 82 of the lower arm cam 70 is transmitted to the lower arm housing 138 through the tubular shaft 146 oscillatorily rotated by a link 156 pivotally attached at one end by a pin 158, FIG. 9, to the end of the arm 154 and at its other end by a pin 160 to the end of an arm 162 integral with, or attached, to the tubular shaft 146. It can therefore be seen that while the upper arm 78 of the loader elbow-joint arm 44 is pivoted relatively to the loader housing 54 by the cam 72, as previously explained, the lower arm 80 of the elbow-joint arm 44 is independently pivoted by the cam 70 around the elbow joint defined by the shaft 140.

The housing 138 of the lower arm 80, preferably made in two sections to facilitate assembly, supports at its lower end a stub shaft 164 by means of appropriate bearings 166, FIGS. 4, 6 and 11, the stub shaft 164 having a projecting portion 168 on which is mounted the part pick-up member or wand 42, FIG. 6. The angular position of the stub shaft 164, and therefore the wand 42, remains spatially substantially constant throughout all the motions of the elbow-joint arm 44 from the home or rest position H shown in phantom line at FIG. 4 to the part pick-up position shown at P in phantom line, to the sagger loading position shown in full line. All throughout the motions of the elbow-joint arm 44, the wand support shaft 164 is prevented from actually rotating, although the lower arm housing 138 is caused to pivot relative to the upper arm housing 130 and the upper arm housing 130 is caused to pivot relative to the loader housing 54 as previously explained. For that purpose, the wand support shaft 164 is connected to the pivot shaft 140 by way of an arm 170 attached to the shaft 164 by means such as a radial setscrew 172, a link 174, FIG. 11, being pivotally attached to the end of the arm 170 at one end and pivotally attached to an arm 176 at its other end, the arm 176 being in turn attached to the pivot shaft 140 by fastening means such as a radially disposed setscrew 178. The pivot shaft 140 is tied to the shaft 100 by way of an arm 180, FIGS. 6 and 10, fastened to the shaft 140 by a setscrew 182, for example, a link 184 interconnecting the arm 180 to an arm 185 attached to the shaft 100 by means such as setscrew 188.

It is readily apparent that the arrangement of the link 184 interconnecting the shafts 100 and 140 and the arrangement of the link 174 interconnecting the shafts 140 and 164 form a pair of deformable parallelograms, acting in opposite direction, such that the angular position of the shaft 164 at the bottom of the lower arm housing 138 remains constantly substantially the same as the angular position of the shaft 100, irrespective of whether the intermediary pivot shaft 140 is rotating or not. This is due to the fact that, irrespective of the position of the upper arm housing 130, the arms 180 and 186 remain parallel and, irrespective of the angular position of the lower arm housing 138 relative to the upper arm housing 130, the arms 170 and 176 remain parallel. As the angular position of the shaft 164 relative to vertical and horizontal coordinates remains substantially the same as the angular position of the shaft 100 relative to such horizontal and vertical coordinates and as the shaft 100 is held stationary, the shaft 164 remains constantly at the same spatial angular position such that, at the part pick-up position P, FIG. 4, of the elbow-joint arm 44 the wand support shaft 164 is oriented such that the part pick-up portion of the wand 42 is directed vertically, and at the sagger loading position, shown in full line at FIG. 4, the wand 42 is also oriented substantially vertically, although preferably at a slight angle to the vertical to accommodate for the inclination of the sagger converyor 12, FIG. 2.

The shaft 100 is held stationary, but adjustable in angular position, by means of a bifurcated arm 190 attached to the shaft 100 by, for example, a radially disposed setscrew 192, FIG. 6, the arm 190 being pivotally attached by way of a pin 194, FIGS. 5 and 6, to a rod 196 mounted tranversely in the loader housing 54 and slidably supported therein. The longitudinal position of the rod 196 is determined by an adjusting fine thread screw 198, FIG. 5, having its end threading in a threaded bore 199 in the end of the rod 196, the screw 198 being held rotatably in a bore 201 through the wall of the housing 54 and being prevented from being displaced in one direction by its head 203 and in the other direction by a washer 205 or other shoulder abutment means, fastened to the body of the screw 198. The angular displacement of the shaft 100, affecting in turn the angular position of the part pickup wand support shaft 164, permits to adjust with precision the position of the wand 42 while picking up parts from the part conveyor 32, FIGS. 1–3, and the generally vertical position, although at a slight angle, of the wand 42 while depositing the parts in a sagger 28 on the sagger conveyor 12, the centerline of the shaft 164 having described the curve 52, FIGS. 2 and 4, in the course of the motion of the elbow-joint arm 44 from the part pick-up position to the sagger loading position.

An example of part pick-up head or wand 42 is illustrated at FIGS. 12–14, mounted on the support end 168 of the wand holder shaft 164 at the end of the lower arm 80 of the loader elbow-joint arm 44 by means of a setscrew 200. The wand 42 has a body portion 202 made of metal or plastic having a solid top portion 204 and an angled sidewall 206. A second sidewall is formed by a plate 208 attached to the side of the body top portion 204 opposite to the integral sidewall 206, by means of screws 209, such as to form an internal chamber 210 between the sidewall 206 and the plate 208. The terminal bottom edge 212 of the sidewall plate 208 and the terminal bottom edge 214 of the inclined sidewall 206 are separated by a narrow space or gap forming a slot 216, FIGS. 13 and 14. The chamber 210 is placed in communication through a passageway 218 and a flexible hose 220 with a source of suction, not shown, through an appropriate valve, not shown. The end of the passageway 218 beyond an orifice 221 placing the passageway in communication with the hose 220 is plugged, as shown at 222. The wand body 202 is provided with an integral enlarged portion 224 having an axial bore 226 for introduction therethrough of the end portion 168 of the holder shaft 164, the setscrew 200 being disposed radially through the body enlarged portion 224.

The wand 42 of FIGS. 12–14 is adapted to pick-up the parts 34 from the part conveyor 32, FIGS. 1–3, one row at a time, for transferring the parts 34 as a row into a sagger 28 on the sagger conveyor 12. When in the pick-up position over the part conveyor 32, with the edge 212 of the wand sidewall plate 208 in close proximity with or, preferably, in physical engagement with the top of each part 34 in the row, air suction is applied to the chamber 210 through the hose 220, the orifice 221 and the passageway 218, and the air suction in the chamber 210 is applied to the top of the parts 34 through the slot 216, thus holding the parts in engagement with the bottom edge 212 of the sidewall plate 208. The tip or edge 214 of the inclined sidewall 206 which projects slightly beyond the tip or edge 212 of the sidewall plate 208 prevents the parts 34 from tipping over.

When the wand 42 is brought over the sagger 28 on the sagger conveyor 12, the source of suction is cut off, and the parts 34 are placed in a row in the sagger. The wand 42 is subsequently returned to its pick-up position by action of the elbow-joint arm 44, such as to pick-up a subsequent row of parts 34, while the conveyor 12 indexes forward the sagger 28 in the process of being loaded of a distance corresponding to one row of parts. The inclination of the sagger conveyor 12 prevents the parts 34 placed in the sagger 28 from falling backwards and causes each consecutive row of parts to be applied, by gravity, against the preceding row.

It will be readily apparent to those skilled in the art that during a full cycle of part pick-up and sagger loading operation, the loader drive motor 58, FIG. 5, is automatically reversed such as to reverse the rotation of the cams 70 and 72, FIGS. 6-8, for reversing the motion of the elbow-joint arm 44 to return the wand 42 to the part pick-up position after dwelling at the sagger loading position.

Figure 15:
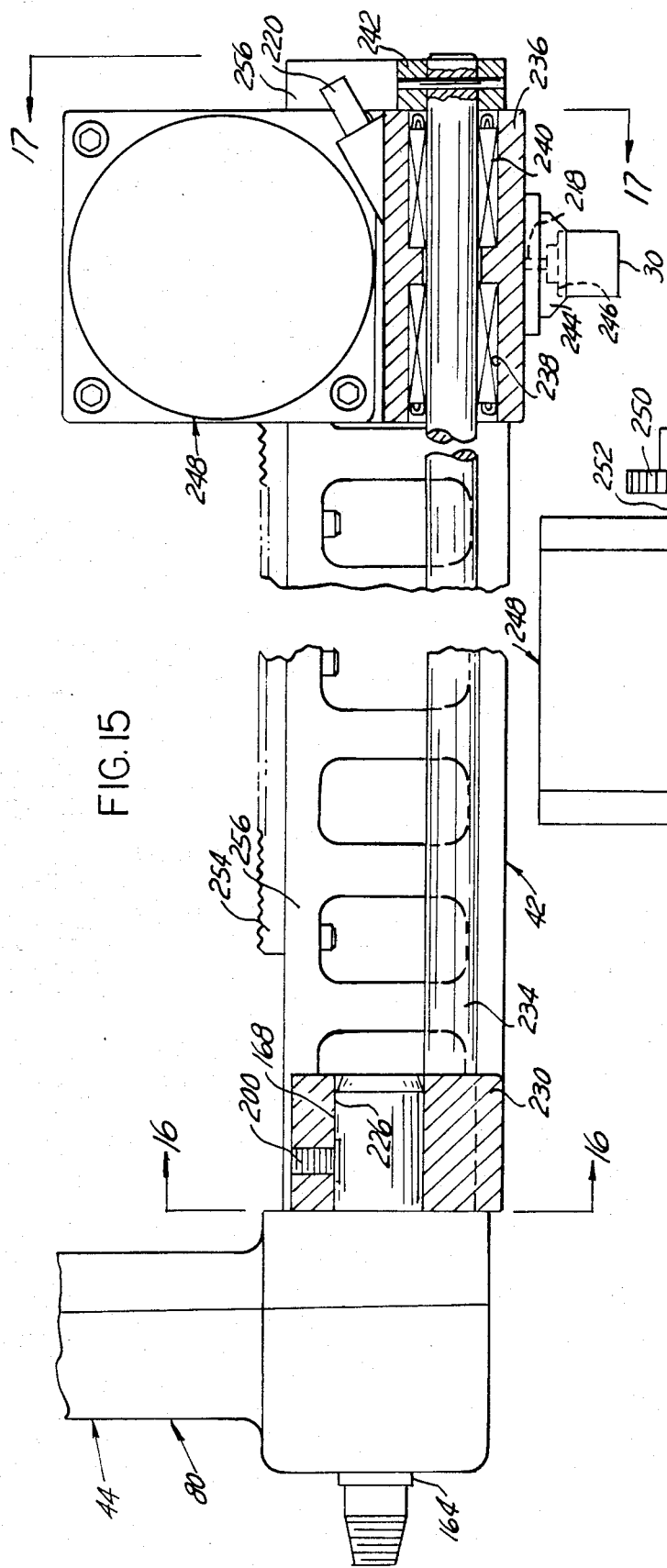
FIG. 15 is a view similar to FIG. 12 but showing a modification thereof.
Figure 17:
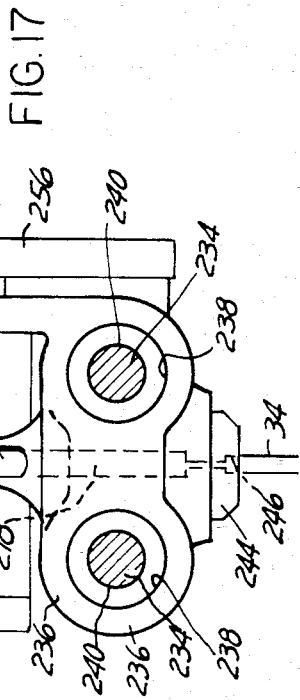
FIG. 17 is a partial end view and section along line 17—17 of FIG. 15.
Figure 16:
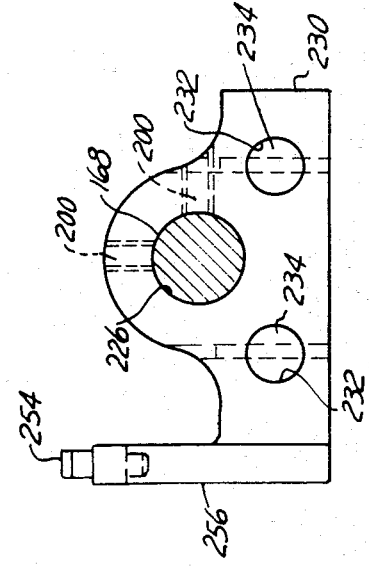
FIG. 16 is a section along line 16—16 of FIG. 15.

FIGS. 15-17 illustrate another example of structure for a wand 42 mounted on the end 168 of the wand holder shaft 164 at the bottom of the loader lower arm 80, for picking up one part 34 at a time for placement in a sagger. The wand 42 of FIGS. 15-17 takes the form of a block 230 provided with a longitudinal bore 226 fitted over the end portion 168 of the support shaft 164, one or more setscrews 200 being disposed radially for clamping the block 230 onto the end portion 168 of the support shaft 164. The block 230 is provided with a pair of parallel longitudinal bores 232 in each of which is affixed the end of one of a pair of rods 234 acting as a support and ways for a slide 236 having a pair of parallel bores 238 provided in turn with linear bearings 240 permitting the slide 236 to be smoothly longitudinally and linearly displaceable along the rods 234. A cross member 242 is mounted on the free end of the rods 234 for tying them together and for providing an abutment for the slide 236 at the end of its travel along the rods 234. A vacuum part pick-up head 244 is mounted below the slide 236. The part pick-up head 244 has a recess 246 placed in communication by a passageway 218 and a flexible hose 220 with an intermittent source of vacuum or air suction for picking up one part 34 at a time from the part conveyor 32. The slide 236 is longitudinally displaced along the rods 234 by a stepping motor 248 mounted on the top of the slide and having a pinion 250, FIG. 17, mounted on its output shaft 252 meshing with a rack 254 mounted on the top of a support bar 256 extending longitudinally parallel to the rods 234. One end of the rack support bar 256 is attached to the block 230 and the other end is attached to the cross-member 242, such that the rods 234, the mounting block 230 and the rack support plate 256 form a sturdy and rigid assembly.

The part pick-up wand 42 of FIGS. 15-17 is adapted to pick-up one part 34 at a time from the part conveyor 32, FIGS. 1-3. For example, the part 34 being picked up is the last part in the row of parts on the part conveyor 32, the slide 236 being positioned by the stepping motor 248 abutting the mounting block 230. After a part 34 has been picked up by the part pick-up head 244, the wand 42 is positioned by the loader elbow-joint arm 42 over the sagger 28 on the sagger conveyor 12, the stepping motor 248 being activated during the travel of the wand 42 from its part pick-up position to its sagger loading position to index the slide 236 to the appropriate order position permitting the part 34 to be placed either at the beginning, or at the end, or at any intermediate position, of a row of parts 34 being loaded in the sagger 28.

It will be readily appreciated that appropriate limit switches, not shown, are provided on the part pick-up and loading wand 42 of FIGS. 15-17 to limit the end of the travel of the slide 236 between the mounting block 230 and the cross-bar member 242, and that the number of electrical pulses fed to the stepping motor 148 corresponds to the position order in a row in the sagger 28 of the part 34 to be loaded therein.

The part pick-up wand 42 of FIGS. 18-21 is also adapted to pick up one part 34 at a time from the part conveyor 32, FIGS. 1-3. The part 34 however takes, for example, the form of an elongate, substantially cylindrical object such as a spark plug ceramic body being picked up from the part conveyor 32 in a substantially horizontal position and being placed vertically in an appropriate order in a row of parts 34 in the sagger 28 on the sagger conveyor 12.

Figure 18:
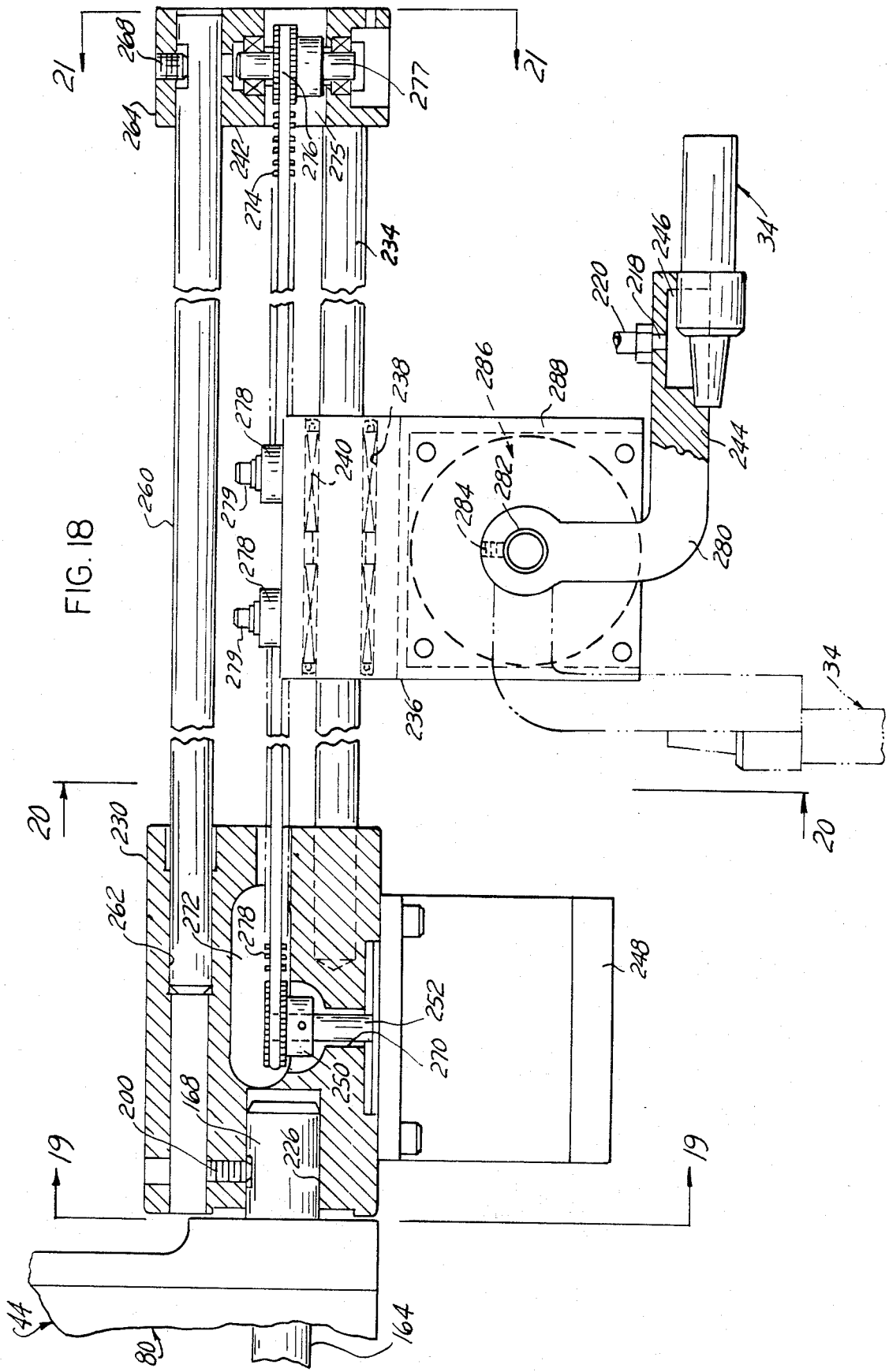
FIG. 18 is a view similar to FIG. 15, but showing a modification thereof.
Figure 19:
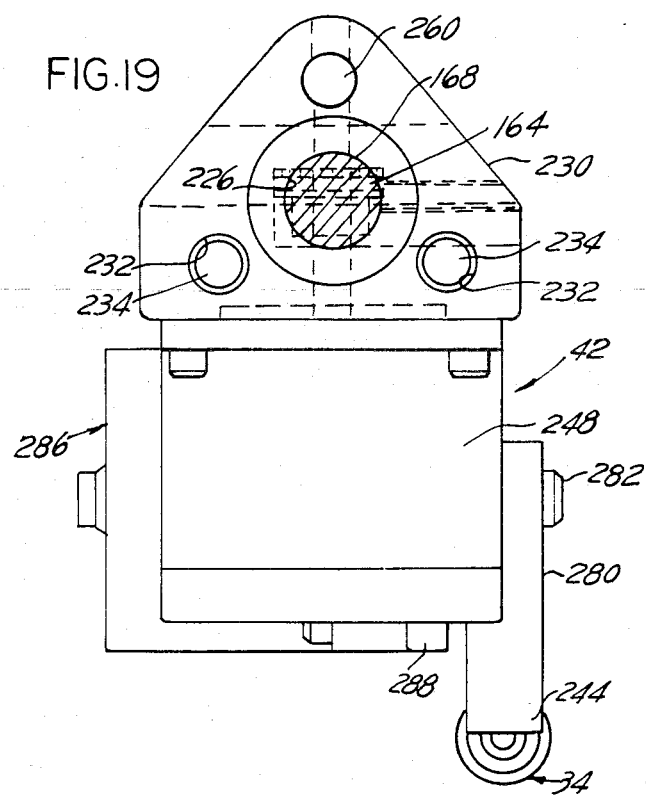
FIG. 19 is a cross-section along line 19—19 of FIG. 18.
Figure 20:
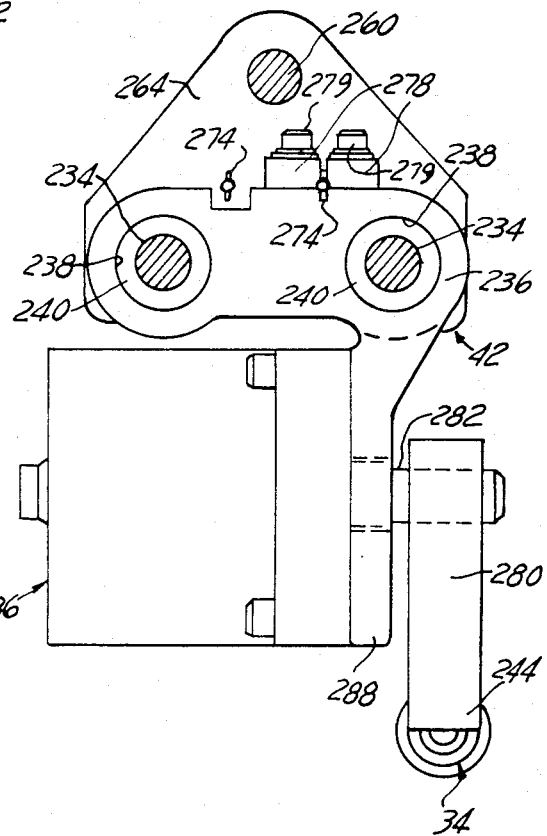
FIG. 20 is a cross-section along line 20—20 of FIG. 18.
Figure 21:
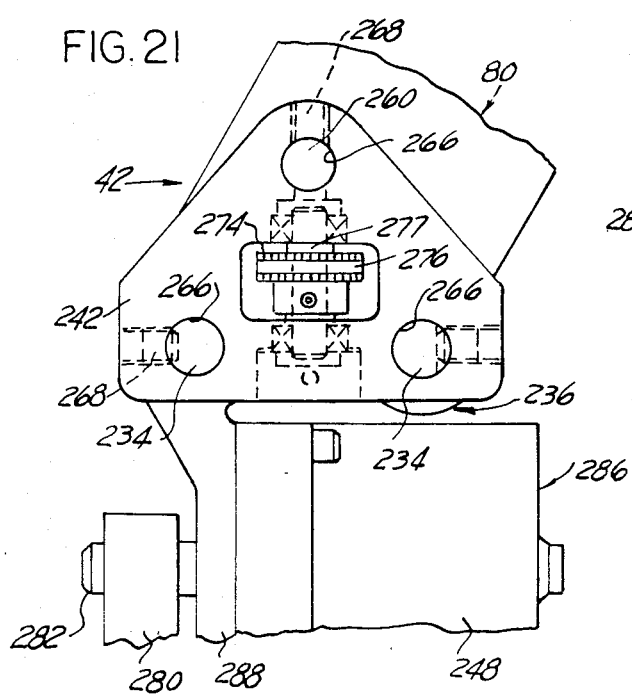
FIG. 21 is a partial end view from line 21—21 of FIG. 18.

The wand 42 of FIGS. 18-21 comprises a support block 230 having a longitudinal bore 226 fitted over the end portion 168 of the support shaft 164 at the bottom of the lower arm 80 of the loader elbow-joint arm 44, by one or more setscrews 200 disposed radially. The block 230 is provided with a pair of parallel bores 232 in each of which is affixed the end of one of a pair of rods 234 acting as a support and ways for a slide 236. The slide 236 has a pair of parallel longitudinal bores 238 provided with linear bearings 240 permitting the slide 236 to be smoothly and linearly displaceable along the rods 234. A third rod 260 is fitted in a third bore 262 in the support block 230, and extends longitudinally parallel to the pair of rods 234. A substantially triangular bracing end block 264, FIGS. 18 and 21, is provided with appropriate bores 266, in which are fitted the other ends of the rods 234 and 269 by means such, as for example, tranverse setscrews 268, such as to provide a strong, sturdy and rigid assembly for supporting the slide 236.

Rather than mounting the slide stepping drive motor 248 on the slide 236 itself, as in the structure of FIGS. 15-17, the stepping motor 248 is bolted below the support block 230, its drive shaft 252 projecting within the block 230 through a bore 270. A cogwheel 250 is mounted on the end of the motor output shaft 252 in a cavity 272 formed in the support block 230. A chain 274 is wrapped around and driven by the motor output cogwheel 250. The chain 274 is also wrapped around a cogwheel 276 mounted on a free-wheeling shaft 277 disposed parallel to the motor output shaft 252 in a cutout portion 275 in the bracing end block 264. One end of the chain 274 is attached to the slide 236 by a clamp member 278, the other end of the chain being attached to the slide 236 by a clamp member 278. Each clamp member 278 takes any appropriate shape, such as that illustrated as consisting of a pair of cam members in the form of eccentric bushings disposed side by side and rotatable to a position clamping the appropriate end of the chain 274. Appropriate socket screws 279 are provided for locking the clamp members 278 in their chain-holding position. Alternatively, the chain 274 may be an endless chain attached at some point to the slide 236.

It can be seen that the stepping motor 248, through the chain 274, is capable of positioning the slide 236 to an appropriate intermediate positions between the support block 230 and the bracing end block 264. The part pick-up head 244 takes the form of an L-shaped arm 280 provided at its end with the recess 246 placed in communication by a passageway 218 and a flexible hose 220, with an intermittent source of vacuum or air suction, not shown. The L-shaped arm 280 is mounted on the output shaft 282, by convenient means such as a setscrew 284, of a rotary actuator 286 mounted below the slide 236 by way of a vertical bracket 288 attached to, or made integral with, the slide 236. The output shaft 282 of the rotary actuator 286 is capable of being controllably rotated about an arc of at least 90 degrees such that the L-shaped arm 280 is rotated from the horizontal position shown in full line at FIG. 18 for picking up the part 34 from its original position on the part conveyor 32 to a substantially vertical position, shown in phantom line at FIG. 18, for placing the part 34 in a substantially vertical position in the sagger 28 on the sagger conveyor 12, FIGS. 1-3. The rotary actuator 286 may be any convenient rotary actuator, electrically or fluid operated such as a rotary actuator manufactured by Ex-Cell-O Corporation and sold under the trademark "ROTAC". Appropriate limit switches, not shown, or other sensors are provided for operating the rotary actuator 286 in conjunction with the displacement of the slide 236 and in conjunction with the travel of the lower arm 80 of the elbow-joint arm 44 of the loader 46.

Figure 22:
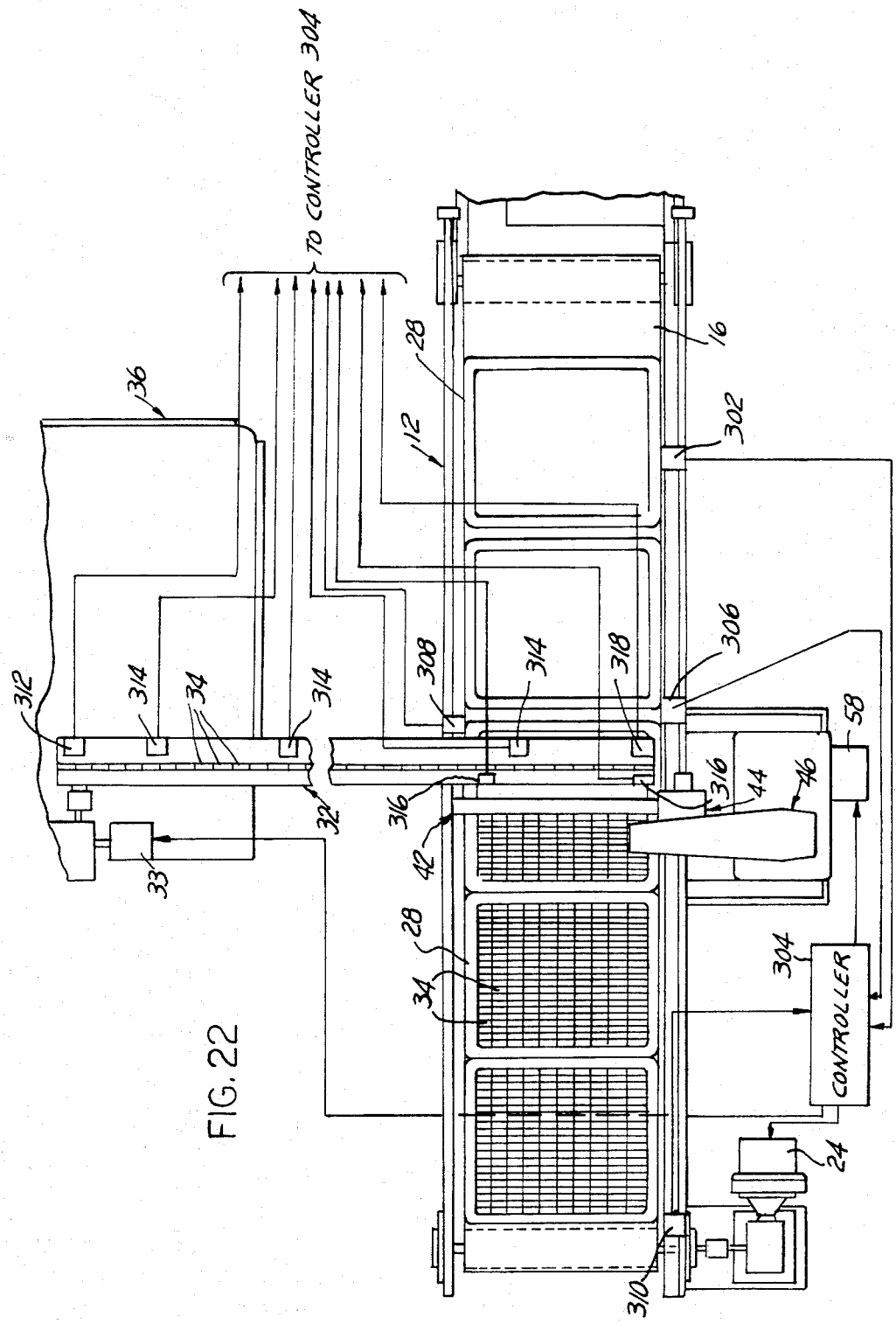
FIG. 22 is a schematic view similar to FIG. 3 and showing an example of control system for the conveyor and loader apparatus of the invention.

The operation of the apparatus of the invention is automatic. Diverse sensors, in the form of pressure switches, limit switches, proximity switches and light beam activated photoelectric sensors are disposed at appropriate locations along the sagger conveyor 12 and the part conveyor 32, to regulate the flow of saggers 28 on the sagger conveyor belt 16, to regulate the flow of parts 34 on the part conveyor 32, and to coordinate the operation of the loader 46 to load the saggers 28 with parts 34 in an appropriate order. As schematically illustrated at FIG. 22, for example, a first sensor 302 is disposed on one side of the sagger conveyor 12 to detect the presence of an empty sagger 28 being placed on the sagger conveyor belt 16. In the event that no sagger is manually or automatically placed on the sagger conveyor belt 16, the sensor 302 through an appropriate controller 304 shuts off the sagger conveyor motor 24, or rings an alarm to call the attention of an operator, or both. A second sensor 306 senses the width of the spacing, if any, between consecutive saggers 28 and provides a signal to the controller 304 stored in a register in the controller 304 for eventually controlling the conveyor motor 24 to feed the conveyor belt 16 an appropriate distance for bringing the next sagger 28 in an appropriate position for beginning loading when a sensor 308 detects that the sagger in the process of being loaded is fully loaded. A sensor 310 installed proximate the end of the sagger conveyor 12 detects the arrival of a full sagger 28 at the end of the sagger conveyor and is arranged to sound an alarm and, for example, after a certain delay, to a stop the operation of the apparatus including stopping the operation of the sagger loader 46 if the sagger is not removed.

The operation of the stepping motor 33 driving the part conveyor 32 is similarly subjected to the control of appropriate sensors detecting the presence of parts at diverse locations along the conveyor 32. For example, a sensor 312, installed at the inlet of the part conveyor 32 detects the presence of parts being ejected from the powder compacting press onto the conveyor 32 at the part ejection station. One or more jam detectors 314 detects the presence or absence of parts at chosen locations along the part conveyor 32 and are arranged to either sound an alarm or stop the operation of the apparatus, or both, in the event that the parts are not regularly disposed in a single file. In arrangements where parts are loaded on a sagger 28 one row at a time, a pair of row detecting sensors 316, disposed along the part conveyor 32 such as to correspond to a full row of parts to be transported by the loader 46 from the part conveyor 32 onto the sagger 28 in the process of being loaded, act as safety devices determining the presence of a row of parts 34 at the end of the part conveyor 32 and preventing operation of the loader 46 unless enough parts to make a row are present at the end of the part conveyor 32.

In arrangements where a single part 34 is loaded from the part conveyor 32 onto the sagger 28, a part presence sensor 318 at the end of the part conveyor 32 actuates the beginning of the operation of the loader 46. Knowing how many parts 34 are to be placed in a row in the sagger 28, for example as stored in a memory in the controller 304, the slide stepping motor 248 of the part loading wand 42 of FIGS. 15-17, or of FIGS. 18-21, is operated such as to locate the part pick-up head 244 on the slide 236 along the slide guiderails or rods 234 to an appropriate position corresponding to the order of the single part 34 being loaded in a row in the sagger 28. The slide stepping motor 248 may be operated under the control of a counter that counts each part being placed by the wand in a row in the sagger.

An appropriate sensor may be disposed at an appropriate location on the wand to determine the presence of a part on the wand and, as will be appreciated by those skilled in the art, other sensors may be disposed for counting the rows of parts being loaded in the sagger 28, when a full row has been placed in the sagger such as to control the sagger conveyor motor 24 to advance the conveyor belt 16 of a distance corresponding to the width of a row, and the like.

Having thus described the present invention by way of examples of structures well adapted to accomplish the purpose of the invention, modification whereof will be apparent to those skilled in the art,

What is claimed as new is as follows:

1. An apparatus for transferring parts, comprising a first conveyor for carrying a single row of parts and travelling along a first axis of travel, a second conveyor having a receptable thereon and travelling along a second axis of travel at an angle to said first axis of travel, said receptacle for carrying parts placed therein in consecutive rows of a predetermined plurality of said parts, a stationary housing disposed at a location where said first axis of travel and said second axis of travel intersect, an elbow-joint arm supported by said housing and pivotable relative to said housing, said elbow-joint arm having a first arm pivotable around a single pivot axis relative to said housing and a second arm mounted on the end of said first arm pivotable around a second pivot axis relative to said first arm, said first and second pivot axes being substantially parallel, a part pick-up member mounted on the end of said second arm, means in said housing for pivoting said first arm relative to said housing and said second arm relative to said first arm for placing said part pick-up member over said parts on said first conveyor for picking up at least one of said parts and for pivoting said first arm relative to said housing and said second arm relative to said first arm for placing said part pick-up member over said receptacle on said second conveyor for placing said part in said receptacle, and means in said part pick-up member for controllably and sequentially grasping and releasing said parts; said part pick-up member comprising a slide, a part pick-up head mounted on said slide, means supporting said slide, and means linearly displacing said slide from a part pick-up position to a part loading position for picking up a single part from said first conveyor and for placing said part in said receptacle on said second conveyor at a predetermined location in a row.

2. The apparatus of claim 1 wherein said pick-up head comprises a recess for accepting a portion of said part, an orifice in said recess and conduit means placing said orifice in communication with a source of suction.

3. The apparatus of claim 1 further comprising means for rotating said part pick-up head through an arc of approximately 90 degrees.

4. The apparatus of claim 3 wherein said part pick-up head is disposed on the end of an arm, said arm being mounted on the output member of a rotary positioner.

5. The apparatus of claim 4 wherein said part pick-up head comprises a recess, an orifice in communication with said recess and means for placing the orifice in communication with a source of suction.

6. The apparatus of claim 1 wherein said means for pivoting said first arm relative to said housing comprises a cam disposed in said housing, means for rotating said cam, a cam follower in rolling engagement with said cam, a shaft pivotably actuated by said cam follower, and means attaching said first arm to said shaft.

7. The apparatus of claim 1 wherein said means for pivoting said second arm relative to said first arm comprises a cam disposed in said housing, means for rotating said cam, a cam followr in rolling engagement with said cam, a first shaft pivotably actuated by said cam follower, a second shaft supporting said second arm relative to said first arm and means interconnecting said first shaft to said second shaft for communicating oscillation of said first shaft to said second shaft.

8. The apparatus of claim 7 further comprising a third shaft mounted on the end of said second arm for supporting said part pick-up member on the end of said second arm, and means maintaining said third shaft substantially in the same angular position throughout pivotal motion of said elbow-joint arm.

9. The apparatus of claim 1 wherein said slide support means comprises a pair of parallel rods and said slide comprises a pair of linear bearings each for engagement over each of said rods.

10. The apparatus of claim 1 wherein said means for linearly displacing said slide comprises a stepping motor mounted on said slide, an output shaft for said stepping motor, a pinion mounted on said output shaft and a toothed rack extending longitudinally alongside said slide, said pinion being engaged with said rack.

11. The apparatus of claim 1 wherein said means for linearly displacing said slide comprises a stepping motor mounted in a stationary position, said stepping motor having an output shaft, a cogwheel mounted on said output shaft, a free-wheeling cogwheel mounted in a support member disposed in a stationary position, and a chain winding over said cogwheels, said chain having ends attached to said slide.

12. The apparatus of claim 1 further comprising means detecting the presence of said parts at the end of said first conveyor for inhibiting the operation of said elbow-joint arm until one of said parts reaches the end of said first conveyor.

13. The apparatus of claim 12 further comprising means detecting the presence of a receptacle on said second conveyor at a predetermined location for inhibiting the operation of said elbow-joint arm unless said receptable is positioned on said second conveyor at said predetermined position.

* * * * *

UNITED STATES PATENT AND TRADEMARK OFFICE
CERTIFICATE OF CORRECTION

PATENT NO. : 4,550,551

DATED : November 5, 1985

INVENTOR(S) : Raymond P. DeSantis

It is certified that error appears in the above-identified patent and that said Letters Patent are hereby corrected as shown below:

On the title page, after "Inventor: Raymond P. DeSantis, 2710 Timberwyck Trail, Troy, Mich. 48098", insert --Assignee: PTX Pentronix, Inc.--.

Col. 2, line 41, correct the spelling of "pillars".

Col. 2, line 64, change "32" to --34--.

Col. 3, line 67, change "92" to --93--.

Col. 6, line 24, change "displacement" to --adjustment--.

Col. 8, line 4, change "arm 42" to --arm 44--;
      line 17, change "148" to --248--;
      line 45, change "269" to --260--.

Col. 9, line 5, change "an" to --any--.

Col. 11, line 39, correct the spelling of "follower".

Signed and Sealed this

Fourth Day of March 1986

[SEAL]

Attest:

DONALD J. QUIGG

Attesting Officer     Commissioner of Patents and Trademarks